United States Patent
Vogler

(10) Patent No.: US 8,051,045 B2
(45) Date of Patent: Nov. 1, 2011

(54) ARCHIVE INDEXING ENGINE

(75) Inventor: Hartmut K. Vogler, Foster City, CA (US)

(73) Assignee: SAP AG, Walldorf (DE)

( * ) Notice: Subject to any disclaimer, the term of this patent is extended or adjusted under 35 U.S.C. 154(b) by 208 days.

(21) Appl. No.: 11/217,212

(22) Filed: Aug. 31, 2005

(65) Prior Publication Data

US 2007/0050333 A1    Mar. 1, 2007

(51) Int. Cl.
*G06F 7/00* (2006.01)
*G06F 17/00* (2006.01)

(52) U.S. Cl. .......................... 707/661; 707/667; 707/673

(58) Field of Classification Search .................. None
See application file for complete search history.

(56) References Cited

U.S. PATENT DOCUMENTS

| | | | |
|---|---|---|---|
| 5,548,770 A * | 8/1996 | Bridges | 707/2 |
| 5,630,121 A * | 5/1997 | Braden-Harder et al. | 707/102 |
| 5,704,060 A * | 12/1997 | Del Monte | 1/1 |
| 5,813,009 A * | 9/1998 | Johnson et al. | 707/100 |
| 5,983,171 A * | 11/1999 | Yokoyama et al. | 704/10 |
| 6,901,418 B2 * | 5/2005 | Gonos | 707/204 |
| 7,035,880 B1 * | 4/2006 | Crescenti et al. | 707/204 |
| 7,516,146 B2 * | 4/2009 | Robertson et al. | 707/102 |
| 2002/0078081 A1 * | 6/2002 | Bierbrauer et al. | 707/500 |
| 2003/0069895 A1 * | 4/2003 | Stephens et al. | 707/104.1 |
| 2004/0167941 A1 * | 8/2004 | Prahlad et al. | 707/204 |
| 2005/0149584 A1 * | 7/2005 | Bourbonnais et al. | 707/204 |
| 2005/0193042 A1 * | 9/2005 | Steinmaier et al. | 707/204 |
| 2006/0149796 A1 * | 7/2006 | Aalmink | 707/204 |

OTHER PUBLICATIONS

Cariño, F. and Burgess, J., "StorHouse/Relational Manager (RM)—Active Storage Hierarchy Database System and Applications", Proceedings of 17th IEEE Mass Storage Systems Symposium, Mar. 2000, College Park, Maryland, pp. 179-186.*
S. Bhattacharya, C. Mohan, K. W. Brannon, I. Narang, H.-I. Hsiao, and M. Subramanian. Coordinating backup/recovery and data consistency between database and file systems. In Proceedings of the 2002 ACM SIGMOD international conference on Management of data, pp. 500-511. ACM Press, 2002.*

* cited by examiner

*Primary Examiner* — Jay Morrison
(74) *Attorney, Agent, or Firm* — Mintz, Levin, Cohn, Ferris, & Glovsky & Popeo, P.C.

(57) ABSTRACT

Methods and apparatus, including computer program products, for archiving data from a database. One method includes identifying a data record to be archived; determining the contents of an archive record, the archive record having values for a first plurality of attributes in the data record; storing the archive record in a data archive; determining the contents of an index record, the index record comprising values for a second plurality of attributes in the data record; adding the index record to a dictionary-based archive index with a reference to the location of the archive record in the data archive; deleting the data record from the database; accepting a query for a desired archive record; and performing a search of the archive index to find the desired archive record.

22 Claims, 7 Drawing Sheets

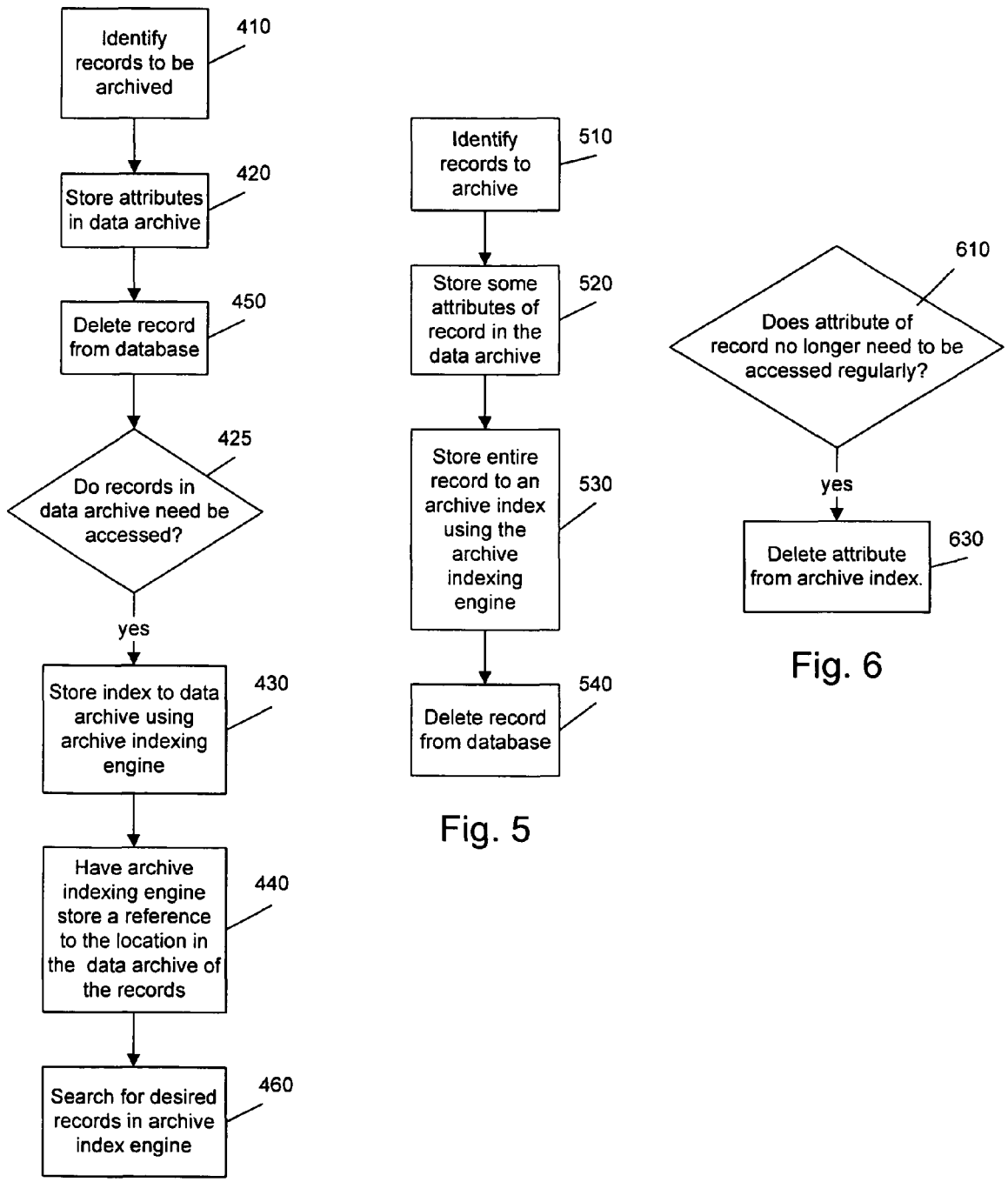

ARCHIVE INDEXING ENGINE

BACKGROUND

The present invention relates to the archiving of data.

Computer systems can store large amounts of data during their operations. Because the data must be available for updating, reading, and writing, data required during operations are stored in a transactional database. Managers of this data may wish to archive the data into storage outside the transactional database. Although stored outside the transactional database, archives must remain accessible for users to read their contents. The type of access available to users is determined by the way in which the archive is stored.

In traditional archives, the archived data is stored in a flat file or other type of convenient storage outside the transactional database. When accessing archived data, a user typically requires one or more particular items of data in the archive. Searching through the archive directly to find a desired item of data can be difficult and time consuming. Therefore, some index to the archive is usually maintained outside the archive. Traditionally, the index to the archive is stored in the transactional database as a sorted set of primary keys referencing the archived data. For each set of values for the keys in the index, the index provides the location of the corresponding data in the archive.

SUMMARY

In general, in one aspect, the invention features a computer-implemented method, and a corresponding computer program product and system. The method includes identifying a data record to be archived from a database; determining contents of an archive record, the archive record comprising values for a first plurality of attributes in the data record; storing the archive record in a data archive; determining contents of an index record, the index record comprising values for a second plurality of attributes in the data record; adding the index record to a dictionary-based archive index with a reference to the location of the archive record in the data archive; deleting the data record from the database; accepting a query for a desired archive record; and performing a search of the archive index to find the desired archive record.

Particular implementations include one or more of the following features. The method includes returning a reference to the location of the desired archive record in the data archive in response to the query. The method includes returning one or more of the values from the index record for the desired record in response to the query. The method includes returning one or more of the values from the archive record for the desired record in response to the query. The second plurality of attributes is a subset of the first plurality of attributes. The second plurality of attributes comprises values for all attributes in the data record. The first plurality of attributes comprises values for all attributes in the data record.

In general, in another aspect, the invention features a computer-implemented method, and a corresponding computer program product and system. The method includes identifying a data record to be archived from a database; determining contents of an archive record, the archive record comprising values for a first plurality of attributes in the data record; storing the first plurality of attributes in a data archive; determining contents of an index record, the index record comprising values for a second plurality of attributes in the data record, the second plurality of attributes at least including the first plurality of attributes; storing the second set of attributes in an archive index; deleting the data record from the database; accepting a query to find a desired data record in the archive index based on the values for the second plurality of attributes; performing a search of the archive index to find the desired data record; and returning as a response to the query a subset of the values for the second plurality of attributes for the desired data record.

Particular implementations include one or more of the following features. The second plurality of attributes includes all attributes in the data record. The method includes removing attributes from the archive index as they become unnecessary. The method includes restoring records to the archive index from the records in the data archive.

The invention can be implemented to realize one or more of the following advantages. The amount of data stored in the transactional database can be reduced, as indexes to the archived data no longer need to be stored there. Maintenance of indexes in a transactional database is no longer required, reducing total cost of ownership associated with ensuring consistency as well as other ACID (atomicity, consistency, isolation, and durability) properties of transactions. Users can perform faster searches on archived data due to the fast searching capabilities provided by a search engine based index. More keys of the archived data can be stored in the index due to better compression algorithms available from a search engine based archive indexing engine. The ability to search through more keys to archived data provides fast discovery of desired archived data.

By storing some archived records, or portions of some archived records, outside the transactional database, the archive index can keep some data "alive" in an immediately-accessible form for read-only access even after it has been removed from the transactional database. A search engine based index provides faster search and retrieval of archived data. A search engine based index can also provide more flexible search and retrieval. Having faster, easier, or more flexible retrieval of archived data from an archive index, relative to an actual archive, may lead to more regular, disciplined use of archiving from a database. The index can retain the data from all records required for immediate read access, providing a resource for read access of a portion and possibly all of the archive that does not require accessing the archived data. The data stored in the index can be reduced over time as read access requirements change. The archive does not need to be accessed regularly for read-only purposes, reducing the risk that it becomes corrupted or otherwise lost. Lower effort can be spent maintaining the index as it can be fully restored from the archived data, reducing related expenses.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

FIG. 4 is a flow chart of a second process for archiving data using an archive indexing engine.

FIG. 5 is a flow chart of a third process for archiving data using an archive indexing engine.

FIG. 6 is a flow chart of a process for deleting data from an archive indexing engine.

Like reference numbers and designations in the various drawings indicate like elements.

DETAILED DESCRIPTION

Figure 1:
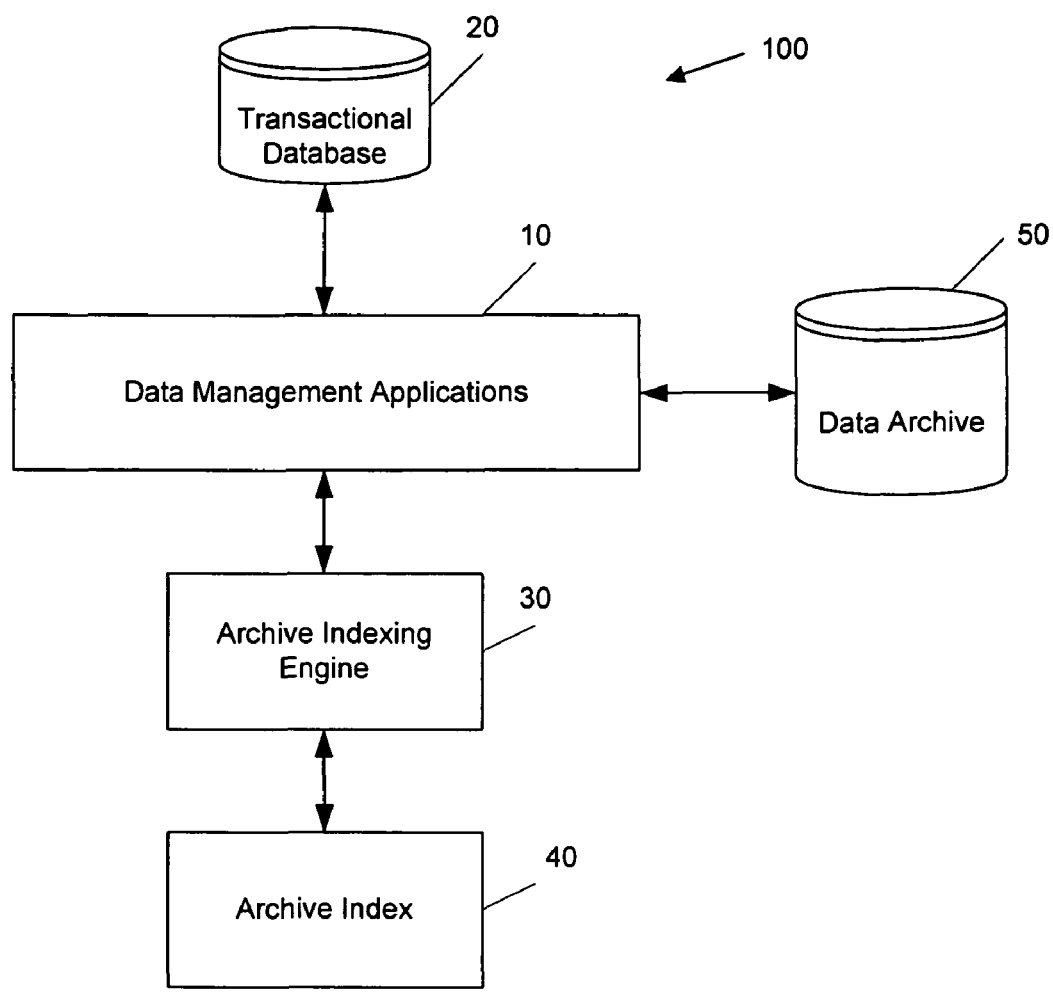
FIG. 1 is a block diagram of a system for archiving data using an archive indexing engine in accordance with one implementation of the invention.

As shown in FIG. 1, an illustrative system 100 includes one or more data management applications 10, a transactional database 20, an archive indexing engine 30, an index 40, and a data archive 50.

In one implementation, the transactional database 20 is managed by a relational database management system. The transactional database 20 represents data as records in database tables, with each record represented by a row, and each attribute by a column in a database table. The data stored for an attribute in a particular record is the value of that attribute for that record. (The word "attribute" may be used to refer either to a field in a record, e.g., a column in a table, or to the value of a field in a particular record. The meaning in any particular case will be clear from the context.) A dataset is a group of related database tables, and several datasets are typically included in the database.

The data management applications 10 provide functions which operate to move data from the transactional database to a data archive 50. The applications 10 also provide an interface for users to request the retrieval of data from the data archive 50. The applications 10 perform the functions necessary to retrieve archived data from the data archive 50. The applications 10 may be implemented as stand-alone computer program applications, such as an archive manager or an archive searcher application, or be embedded software within one or more enterprise applications or a database management system.

When a data management application 10 archives records from a transactional database 20, some attributes (more precisely, the data values of the attributes) of the records are stored in the data archive 50. The data archive 50 may be organized to store archived records in tables, flat files, or some other format. The data archive 50 may be on line so that users or applications can continually access records in the archive. The data archive 50 may be stored off line on alternative media for offline storage, perhaps at another site, as business requirements dictate.

An index to the archived records in the data archive 50 facilitates later access to the records. In some conventional systems, such an index was maintained by indexing primary keys of the archived records within the transactional database 20. Along with the values of the primary keys, the transactional database 20 stored the location in the data archive of the indexed record.

An archive indexing engine 30 is a computer program application or software module that provides an alternative method of storing an index to a data archive 50. The engine 30 stores a subset of attributes of archived data records as an archive index 40. The archive index may consist of the same set of primary keys (attributes) traditionally stored as an index to the data archive 50. Advantageously, however, the archive index may be implemented to store a larger set of attributes as indexes. The archive index 50 is stored outside the transactional database 20 by the archive indexing engine 30. The archive indexing engine may store in the archive index the location in the data archive where each indexed record is to be found.

Figure 2:
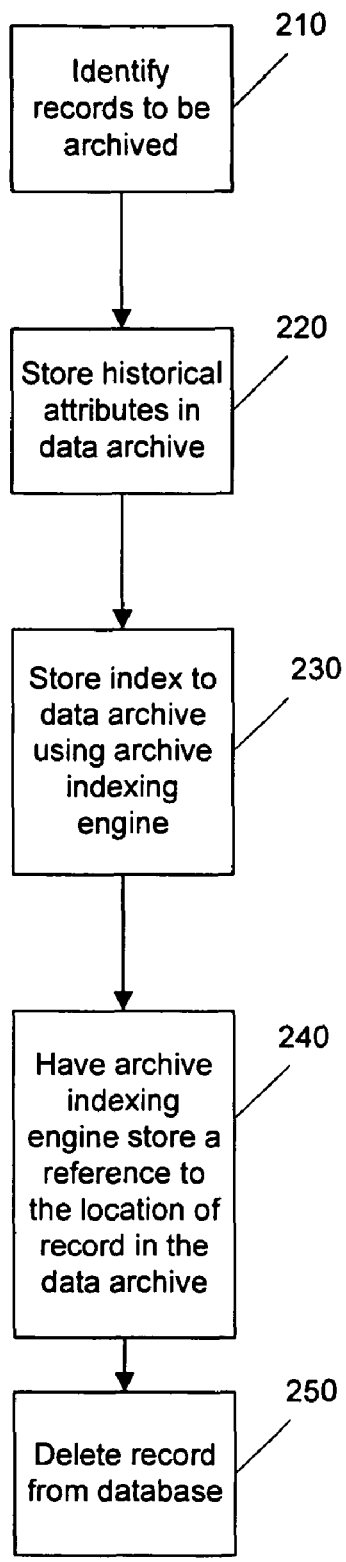
FIG. 2 is a flow chart of one process for archiving data using an archive indexing engine.

FIG. 2 illustrates one process for archiving data using a system such as system 100. First, the process identifies certain records to be archived (step 210). Then, some attributes of the records, possibly all, are stored in a data archive (step 220). An index to the data archive is created by the archive indexing engine (step 230). The location of the indexed record in the data archive is stored in or along with the index by the archive indexing engine (step 240). In one implementation, the location of the indexed record in the data archive is stored as a file identifier along with an offset indicating the location of the indexed record within the data archive file. Finally, the archived record is deleted from the transactional database (step 250).

Figure 3:
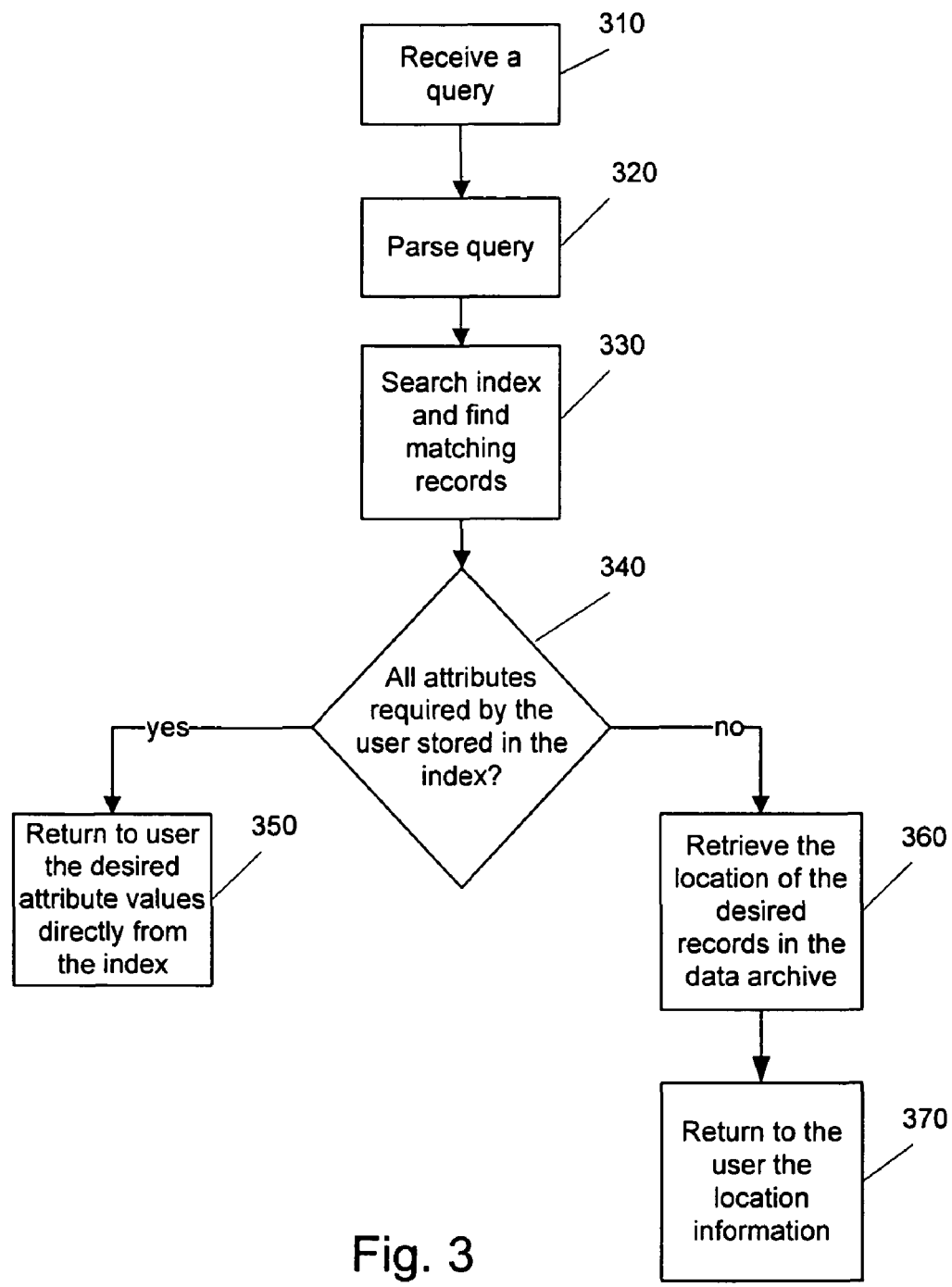
FIG. 3 is a flow chart of a process for accessing data archived according to the process in FIG. 2.

Once data has been archived, a process as illustrated in FIG. 3 can be used to read the values of the archived data. First, the process begins when it receives from a user a query for records in the data archive (step 310). The user may be a human user or an application. A query generally specifies search conditions for selecting records. In a conventional SQL SELECT statement form of query, for example, the search conditions would be expressed in the WHERE clause. A query generally also specifies which attributes of the selected records—i.e., the records satisfying the search conditions—are to be returned to the user. In a conventional SQL SELECT statement form of query, for example, the attributes to be returned would be expressed in the SELECT clause. Alternatively, a query may be submitted in the form of a search engine query in which the user specifies certain desired terms. The query may be submitted by the user directly using an SQL or a search engine query format. Alternatively, an application may provide a graphical user interface permitting the requester to provide as input fields the desired values for particular attributes. The application then transforms the input fields into the appropriate type of query. For example, if the requested archive index is stored in a database permitting SQL queries, the application may convert the query to a SQL SELECT statement. If the archive index is stored in a search engine, the application may convert the query to a search engine query.

The process then parses the query (step 320). The archive index is then searched for the records having values matching the search conditions (step 330). If the search is successful, one or more matching records with the required values will be found. The process returns one of two answers to the user originating the query. If all the attributes of the matching records that must be returned to the user are stored in the index ("yes" branch from step 340), the process returns to the user the desired attribute values directly from the index (step 350). This eliminates having to retrieve any data from the data archive. Otherwise ("no" branch from step 340), the process retrieves the locations of the matching records in the data archive (step 360). The process then returns to the user the location information for the desired records in the data archive (step 370). Alternatively, the process directly accesses the data archive and retrieves the matching records and returns the requested attributes.

FIG. 4 illustrates another process for archiving data, in which an index, or a complete index, need not be created when the data from the transactional database is archived. The process identifies records to be archived (step 410), stores some subset of the attributes of the records in a data archive (step 420), and deletes the records from the transactional database (step 450). Then, only when the records in the data archive need to be accessed (step 425), an index to the data archive is created and stored using the archive indexing engine (step 430). The indexing engine stores a reference to the locations in the data archive of the archived records (step 440). Once the index has been created, the process searches for the desired records using the indexing engine (step 450). A process such as that described with reference to FIG. 3 may be used to respond to a query for particular records. The process described in FIG. 4 for archiving data may be used to access archived records during an auditing process. The archived data may never be accessed for other business purposes, making the maintenance of an archive index unnecessary. However, if an audit is conducted, the archived data must be made accessible to auditors. The faster and easier it is to index the archived data, the more efficiently the audit can be conducted.

FIG. 5 illustrates a process that can be used in an implementation in which the index stored by the archive indexing engine contains all the attributes that must be made available for access by users. The process first identifies particular records to be archived (step 510). The process stores some subset of attributes to the data archive (step 520). The process then stores all attributes that are to be made available for access by users, here all attributes of the record in the transactional database, using the archive indexing engine (step 530). The archived records are deleted from the transactional database (step 540). When accessing data archived as illustrated in FIG. 5, a query for archived records will not have to retrieve values from the data archive, but can be satisfied entirely by data in the archive index. Therefore, the archive indexing engine need not store any location information referencing the location of particular data records in the data archive; the archive index is no longer an "index" to the data archive. The archive index provides direct access to required data from the data archive without having to access the data archive.

FIG. 6 illustrates a process that reduces the attributes stored in the archive index. The process determines that an attribute indexed in the archive index no longer needs to be accessed regularly (step 610). For example, in the business scenario above, most attributes are no longer needed by users after one year. If so, then the attribute can be removed from the archive index (step 630).

Alternatively, an archive index can be used both to provide immediate access to attributes and as an index to the data archive. For example, after archiving data according to the process of FIG. 5, a process can also store location information in the archive index pointing to records in the data archive. Because all attributes are stored in the archive index, the index provides direct access to record values. Because the location data is stored, the index also serves as an index to the archive.

Figure 7:
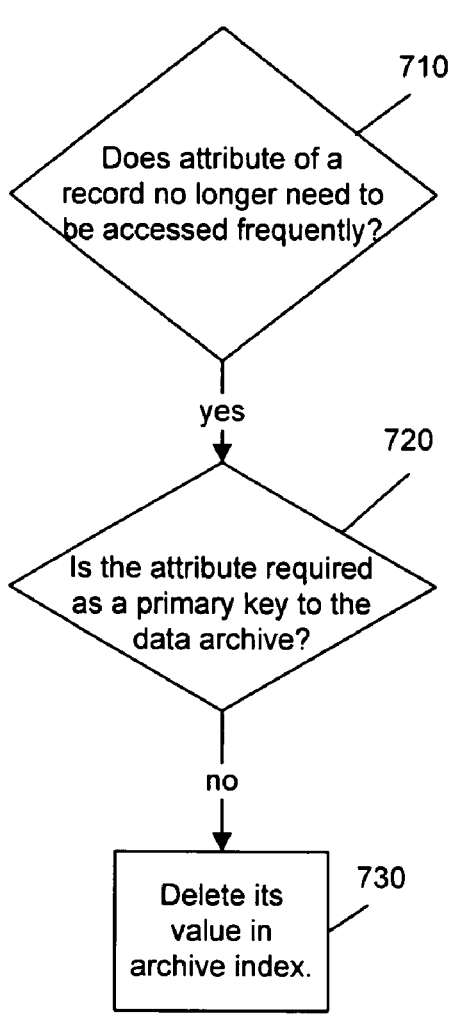
FIG. 7 is a flow chart of a process for deleting data from an archive indexing engine.

FIG. 7 illustrates a process for deleting attributes or attribute values from this archive index. The process first determines whether the attribute or attribute value is required for frequent user read access (step 710). An attribute may not be required because it is in an index that is associated with a period of time that is generally no longer of interest. An attribute value may not be required because it is in a record that is rarely accessed. The determination can be implemented as a batch process running offline. The batch process collects data on the types of queries run by users. It then applies artificial intelligence or statistical techniques to determine which attributes are accessed, which should remain in the index, and which should be deleted. One implementation uses Bayesian inference to determine whether the attribute is required for frequent user read access. If an attribute is not required for frequent user read access, the attribute may nevertheless still be useful or required as a key to the archived data. The process therefore determines whether the attribute is required in the index as a key for accessing records in the data archive (step 720). If not, the process deletes the attribute (step 730). Once a record no longer needs to be kept in a frequently accessed form, all of its attributes will be deleted from the archive index and it will no longer be indexed. As described above, an index may later be created in case the data archive does need to be accessed. Often, business requirements may mandate that a data archive is stored for much longer than it is actively accessed. By storing accessed attributes in the archive index, they will be available directly from the archive index which may provide faster access to the data. By deleting the indexes that are no longer accessed, the size of the archive index can be kept small.

The record attributes that must be available for users in the archive index may change over time. For example, all of the attributes of a transactional record may be required for one year after the transaction. After that, a smaller set of attributes may be required for historical purposes for another 10 years. Using the process described above, all attributes from the transactional record are stored in an archive index and the smaller set of historical attributes is stored in the data archive. Then, after one year, most of the attributes in the archive index can be deleted and only a few attributes selected as index keys to the archived records remain in the archive index.

In some implementations, the archive index stores the same attributes as are stored in the data archive, or fewer. In these implementations, the data archive serves as a complete backup for the index. The index can be stored by the archive indexing engine into a convenient storage format to provide access to its values. This format may not be one that is robust or it may not be rigorously maintained. However, if the index is corrupted or is lost due to, for example, a system crash, the index can be recreated from the data archive.

In one implementation, the archive indexing engine 30 is a search engine. The search engine indexes each archived record as a distinct document with a unique document ID. The search engine indexes documents searchable in a dictionary-based index, in which every term, such as a word, used in the data is stored in a dictionary. The search engine further stores information indicating which documents contain each term and information indicating the attribute in which each term was found and any data type information.

Figure 8:
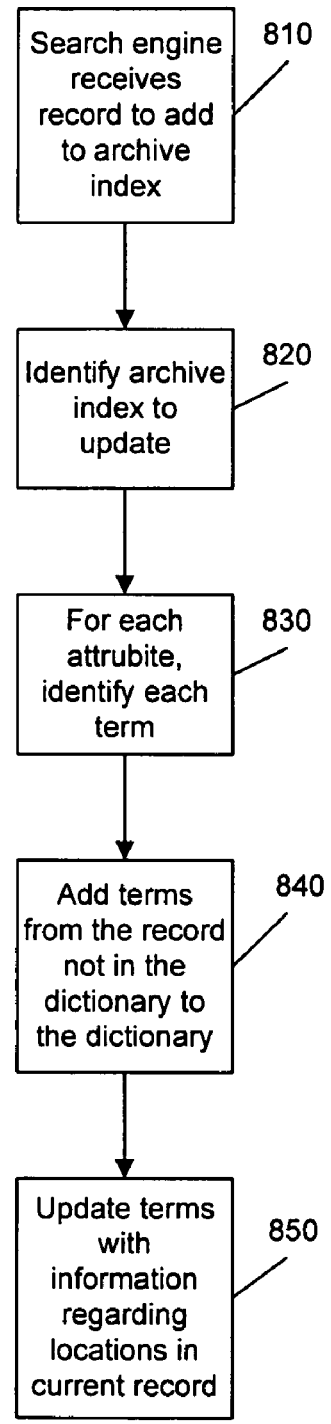
FIG. 8 is a flow chart of a process for archiving data using a search engine as archive indexing engine.

FIG. 8 illustrates a process within a search engine that indexes a record into a dictionary-based archive index. The process is initiated when the search engine receives the attributes of a record to add to an archive index (step 810). The search engine identifies the archive index to be updated with the record's attributes (step 820); if there is none, a new archive index will be created. In one implementation, separate archive indexes are created to cover particular times periods. Then, for each attribute value, the process identifies each term within that value (step 830), e.g., when the attribute is a text field that contains multiple words, e.g., in an address or company name. For each term, if the term is not already in the dictionary, the process adds the term (step 840). The process then updates the term in the dictionary with information regarding the current instance of the term: the document number, the attribute the term was found in, and its location within the attribute (step 850).

A search-engine-based archive indexing engine may create an archive index as follows. The engine receives a request to create a new index. The request includes information regarding the attributes included in records that will be stored in the index, and the data type of each of the attributes. The search engine creates an empty dictionary-based index for the archive index and gives each attribute a unique identifier. When storing a term in the dictionary, each instance of a term is marked with the attribute identifier signifying the attribute in which the term was found.

The search engine also provides a query-based search through data records stored in its dictionary-based structures. The interface for accepting queries may accept the entry of just desired words as in web-based search engines or permit complex attribute-value queries. The interface may require that the user or application searching provide a specific dictionary-based structure to search. After receiving a query, the search engine parses the query for the desired attribute values, and divides these into the desired terms. The search engine selects the dictionary in the queried dictionary-based structure, returning those document IDs (identifiers) containing the desired terms within the value for the queried attribute.

The search engine may also provide other types of flexible querying functions. For example, in one implementation, the search engine can perform a similarity search. For example, the search engine can return all records with values within one character of the desired term. The breadth of the results returned by the similarity search are configurable. In another implementation, queried terms can be expanded to include synonyms. For example, a search for the attribute value "car" will also return records with values of "auto", "automobile", and "vehicle". This functionality can be implemented in the search engine or in applications which process the queries sent to the search engine.

In one implementation, the search engine used is the TREX search engine, which is part of the TREX (Text Retrieval and Information EXtraction) search service available from SAP AG of Walldorf (Baden) Germany. TREX is designed to be used as a secondary data store with asynchronous update.

TREX includes an attribute engine that can index and search in document attributes such as author, date/time of creation, date/time of last change, and so on, including attributes with multiple values, and implements a fast search for structured data in tables. The attribute engine represents records as documents, each with a unique document ID. Each table column, corresponding to a table attribute, is stored as a document attribute. The attribute engine maintains its own indexes, separate from other indexes of the search engine which can be used for unstructured data. The attribute engine can manage different attribute types, including string, integer, float, date, time, path, and price.

TREX provides optimized dictionaries for all attribute types. For example, the string dictionary is supported with methods for compressed storage or string data, sorted insertion of values, and both an exact search and a pattern search with iteration. In addition, TREX implements compressed indexes, which generally allows indexes to be stored in computer random access memory, reducing the need for disk access.

TREX also provides optimized disk-based attribute storage for indexes in which there is too much attribute data to hold completely in memory. The data is organized in B-trees, grouped into small amounts of data, on the order of 4 to 8 kilobytes. The data in the nodes of the B-trees are stored in memory, while the leaf data is stored no disk, loaded into memory on demand and cached. This storage allows fast estimation of the result set by searching the nodes in memory, enabling query optimization.

Figure 9:
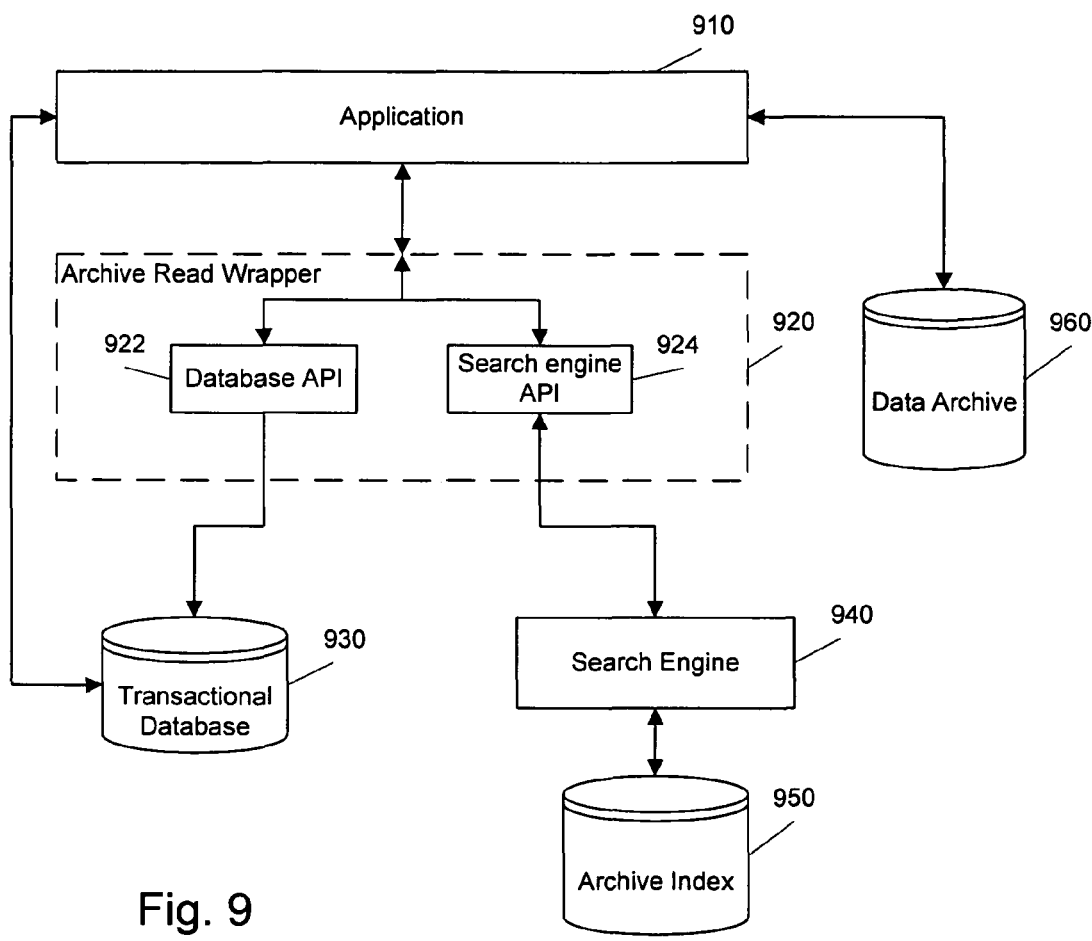
FIG. 9 is a block diagram that illustrates a computer program application using an archive indexing engine in accordance with one implementation of the invention.

FIG. 9 illustrates an application 910 using an archive indexing engine that is a search engine 940 such as the TREX search engine in accordance with one embodiment of the invention. The application 910 can be any kind of interactive or batch computer program application, including a distributed enterprise business application, or an application implemented in or made available through a web portal. The application 910 in performing transactional operations of reading and writing data uses a database 930. Data from the database is archived using a search engine 940 and an archive index 950, using any appropriate one of the methods described in this specification.

An archive read wrapper 920 is implemented in an application development environment or a programming framework to provide a common API (application programming interface) for read operations directed to archive data stored in a database archive index 930 or the archive index stored in the search engine 940. The read wrapper 920 receives requests from the application 910 to access archived data and uses a database API 922 to perform the request on the database archive index 930, or uses a search engine API 924 to perform the request on the search engine 940, or both, according to the request. Alternatively, the database archive index can be stored in a database different from the one storing the transactional data of the application 910. Having such a wrapper available, the application programmer does not need to know whether the data being read from an archive is stored using a traditional table-based index or a search-engine-based index. The data from the transactional database 930 and from the data archive 960 can then be read by the application 910.

To create an archive index, an application creates an index definition by calling a create index function in TREX, including an index identifier as a parameter to the function. The call may also specify the attribute definitions of the index, but attributes need not be defined during creation of the index. An application may also create attribute definitions later. An attribute definition includes a name for the attribute, an attribute type, and a group name for a structured attribute.

Once an index has been created, documents can be indexed by passing them to TREX using an index function. Parameters to the function include the identifier of the index to be updated by the request and a list of documents requiring indexing. The parameters of each document in the list includes a table of its attributes. The attribute parameters include the attribute name, value, and attribute type.

The index function is also used to remove documents from an index. It may be desirable to remove documents from the index, for example, when documents are no longer required for immediate access as in the processes described in reference to FIG. 6 and FIG. 7. To remove documents from a TREX attribute engine index, an application calls the index function with a parameter set to specify that the documents should be removed from the index. The remaining parameters describe the index to update and the documents to be removed.

TREX can update an index either synchronously or asynchronously. If asynchronous indexing is enabled, indexing updates are scheduled to run when the TREX engine has less load from search queries. After updating the indexes, TREX optimizes the indexes either automatically or after an explicit function call.

In an alternative implementation, the archiving indexing engine is implemented as a database management system storing the archive index in a read-only database. The engine does not permit typical users to make changes to the archive index in the database, so that data consistency and ACID properties are not at issue. Updates to the index are made only as batch processes by an administrator. The read-only database provides indexes stored using a hash table-based data structure rather than the dictionary-based data structure of a search engine.

Figure 10:
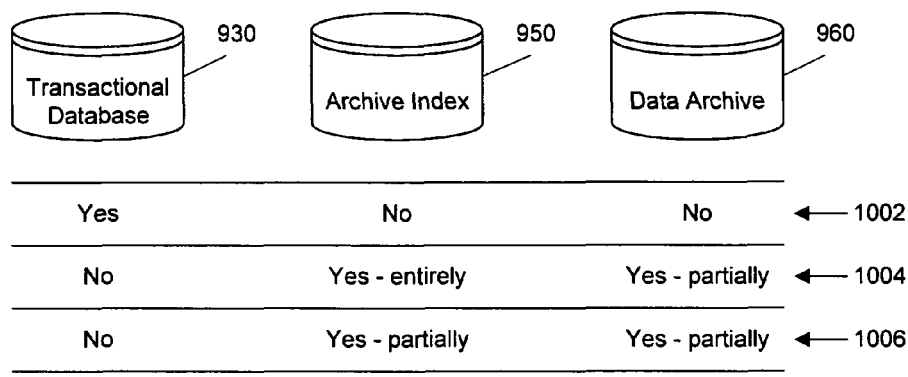
FIG. 10 is a diagram that illustrates the lifecycle of data records in accordance with one implementation of the invention.

FIG. 10 illustrates the lifecycle of data records in one implementation of the invention. While records are writable, e.g., while they can be changed by a business application, they are stored in a database, e.g., database 930, but not in an archive index or a data archive (row 1002). After they become read only, they are deleted from the database but maintained in an archive index, e.g., archive index 950, and in a data archive, e.g., data archive 960. The records in the data archive are only there partially, that is, they are reduced to include only the attributes that are required for long term storage, e.g., because of legal requirements. While they are of current interest, e.g., while they are recent within a define time window, the records are maintained entirely in the archive index, i.e., all the attributes are stored in the archive index, but only partially in the data archive, as just mentioned (row 1004). When they are no longer of current interest, e.g., after they are only rarely referenced, the records are maintained only partially in the archive index and only partially in the data archive (row 1006). As the requirements for maintaining records in the data archive expire, the records are removed from the data archive and from the archive index.

Embodiments of the invention and all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer-readable medium, e.g., a machine-readable storage device, a machine-readable storage medium, a memory device, or a machine-readable propagated signal, for execution by, or to control the operation of, data processing apparatus. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

What is claimed is:

1. A method comprising:
   identifying a data record for deletion from a database and storage in a data archive, the data record comprising a plurality of data record attributes, each of the plurality of data record attributes comprising a value that comprises at least one term;
   creating an archive record that comprises a first subset of attribute values of the plurality of data record attributes and an index record that comprises a second subset of attribute values of the plurality of data record attributes;
   storing the archive record in a data archive that is stored separately from the database;
   adding a reference to a location of the archive record in the data archive to the new index record;
   adding the new index record to a dictionary-based archive index that is stored separately from the database, the dictionary-based archive index comprising a plurality of index records and a dictionary, the adding of the index record to the dictionary-based archive index comprising identifying every term of the second subset of attribute values of the plurality of data record attributes and adding each of the terms to the dictionary except for those terms that are already in the dictionary, wherein at least one index record of the plurality of index records in the dictionary-based archive index comprises one term from terms stored in the dictionary, references to locations of multiple archive records in the data archive that contain the one term, and information regarding locations of the one term within the referenced multiple archive records, the location information including indications, for each of the multiple of archive records referenced by the at least one index record, respective attributes of the each of the multiple archive records in which the one term is found;
   deleting the data record from the database;
   determining whether an attribute value of the plurality of attribute values is required for frequent user read access; and
   if the attribute value is not required for frequent user read access, deleting the attribute value from the dictionary-based archive index.

2. The method of claim 1, further comprising:
   accepting a query from a user for a desired archive record;
   performing a search of the archive index to find the desired archive record; and
   returning a reference to the location of the desired archive record in the data archive in response to the query.

3. The method of claim 1, further comprising:
   accepting a query from a user for a desired archive record;
   performing a search of the dictionary-based archive index to find the desired archive record; and
   returning one or more of the values from the index record for the desired archive record in response to the query.

4. The method of claim 1, further comprising:
   accepting a query from a user for a desired archive record;
   performing a search of the archive index to find the desired archive record; and
   returning one or more of the values from the desired archive record in response to the query.

5. The method of claim 1, wherein the second subset of attribute values is fully included within the first subset of attribute values.

6. The method of claim 1, wherein one or more of the first subset and the second subset of attribute values comprises values for all attributes in the data record.

7. The method of claim 1, wherein:
   the second subset of attribute values at least includes the first subset of attribute values; and
   accepting a query for a desired archive record comprises accepting a query to find the desired data record in the dictionary-based archive index based on the values for the second subset of attribute values;
   the method further comprising:
   accepting a query from a user for a desired archive record;
   performing a search of the archive index to find the desired archive record; and
   returning as a response to the query a responsive subset of the values for the second subset of attribute values for the desired data record.

8. A computer program product, encoded in an information carrier, operable to cause data processing apparatus to perform operations comprising:
   identifying a data record to be archived, the data record comprising a plurality of data record attributes and originally residing in a database;
   creating an archive record, the archive record comprising a first subset of the plurality of data record attributes, the first subset comprising at least some of the plurality of data record attributes;
   storing the archive record in a data archive, the data archive being maintained separately from the database;
   creating a new archive index record, the new archive index record comprising a reference to a location of the archive record in the data archive and a second plurality of attributes of the plurality of data record attributes, the second subset comprising selected attributes from the plurality of data record attributes, the selected attributes being those identified as necessary for access by users of the database;
   adding the new archive index record to a dictionary-based archive index, the dictionary-based archive index comprising a plurality of archive index records, being stored separately from the database, and comprising a dictionary storing every term used in the plurality of index records;
   deleting the data record from the database;
   determining whether an attribute value of the plurality of attribute values is required for frequent user read access; and if the attribute value is not required for frequent user read access, deleting the attribute value from the dictionary-based archive index.

9. The computer program product of claim 8, further operable to cause data processing apparatus to perform operations comprising:
accepting a query from a user for the data record, the query requesting at least one requested attribute not included in the second subset of the plurality of data record attributes;
performing a search of the archive index to find the location of the archive record based on the reference in the new archive index record; and
returning the reference to the location of the archive record in the data archive in response to the query.

10. The computer program product of claim 8, further operable to cause data processing apparatus to perform operations comprising:
accepting a query from a user for the data record, the query requesting one or more requested attributes that are part of the second subset of the plurality of data record attributes;
performing a search of the archive index to find the new archive index record; and
returning the one or more requested attributes of the data record from the new archive index record in response to the query without accessing the archive record in the data archive.

11. The computer program product of claim 8, further operable to cause data processing apparatus to perform operations comprising:
accepting a query from a user for the data record, the query requesting at least one requested attribute not included in the second subset of the plurality of data record attributes;
performing a search of the archive index to find the location of the archive record based on the reference in the new archive index record;
accessing the archive record from the data archive to retrieve the at least one attribute; and
returning the at least one requested attribute in response to the query.

12. The computer program product of claim 8, wherein: the second plurality of attributes at least includes the first plurality of attributes.

13. A system comprising:
at least one processor; and
an information carrier storing instructions that, when executed by the at least one processor, cause the at least one processor to perform operations comprising:
identifying a data record to be archived, the data record comprising a plurality of data record attributes and originally residing in a database;
creating an archive record, the archive record comprising a first subset of the plurality of data record attributes, the first subset comprising at least some of the plurality of data record attributes;
storing the archive record in a data archive that is separate from the database;
creating a new archive index record, the new archive index record comprising a reference to a location of the archive record in the data archive and a second plurality of attribute of the plurality of data record attributes, the second subset comprising selected attributes from the plurality of data record attributes, the selected attributes being those identified as necessary for access by users of the database;
adding the new archive index record to a dictionary-based archive index, the dictionary-based archive index comprising a plurality of archive index records, being stored separately from the database, and comprising a dictionary storing every term used in the plurality of index records;
deleting the data record from the database; and
deleting, after a selected period, the values of all but a selected subset of the plurality of data record attributes from the dictionary-based archive index, the selected subset of the plurality of data record attributes comprising an index key to the archived record.

14. The system of claim 13, wherein the operations further comprise:
accepting a query from a user for the data record, the query requesting at least one requested attribute not included in the second subset of the plurality of data record attributes;
performing a search of the archive index to find the location of the archive record based on the reference in the new archive index record; and
returning the reference to the location of the archive record in the data archive in response to the query.

15. The system of claim 13, wherein the operations further comprise:
accepting a query from a user for the data record, the query requesting one or more requested attributes that are part of the second subset of the plurality of data record attributes;
performing a search of the archive index to find the new archive index record; and
returning the one or more requested attributes of the data record from the new archive index record in response to the query without accessing the archive record in the data archive.

16. The system of claim 13, wherein the operations further comprise:
accepting a query from a user for the data record, the query requesting at least one requested attribute not included in the second subset of the plurality of data record attributes;
performing a search of the archive index to find the location of the archive record based on the reference in the new archive index record;
accessing the archive record from the data archive to retrieve the at least one attribute; and
returning the at least one requested attribute in response to the query.

17. A computer program product, encoded in an information carrier, operable to cause data processing apparatus to perform operations comprising:
identifying a data record for deletion from a database and storage in a data archive, the data record comprising a plurality of data record attributes, each of the plurality of data record attributes comprising a value that comprises at least one term;
creating an archive record that comprises a first subset of attribute values of the plurality of data record attributes and an index record that comprises a second subset of attribute values of the plurality of data record attributes, the second subset including all of the data record attributes;
storing the archive record in a data archive that is stored separately from the database;
adding a reference to a location of the archive record in the data archive to the new index record;

adding the new index record to a dictionary-based archive index that is stored separately, from the database, the dictionary-based archive index comprising a plurality of index records and a dictionary, the adding of the index record to the dictionary-based archive index comprising identifying every term of the second subset of attribute values of the plurality of data record attributes and adding each of the terms to the dictionary except for those terms that are already in the dictionary, wherein at least one index record of the plurality of index records in the dictionary-based archive index comprises one term from terms stored in the dictionary, references to locations of multiple archive records in the data archive that contain the one term, and information regarding locations of the one term within the referenced multiple archive records, the location information including indications, for each of the multiple of archive records referenced by the at least one index record, respective attributes of the each of the multiple archive records in which the one term is found;

deleting the data record from the database; and deleting, after a selected period, the values of all but a selected subset of the plurality of data record attributes from the dictionary-based archive index, the selected subset of the plurality of data record attributes comprising an index key to the archived record.

18. A method comprising:

identifying a data record to be archived, the data record comprising a plurality of data record attributes and originally residing in a database;

creating an archive record, the archive record comprising a first subset of the plurality of data record attributes, the first subset comprising at least some of the plurality of data record attributes;

storing the archive record in a data archive, the data archive being maintained separately from the database;

creating a new archive index record, the new archive index record comprising a reference to a location of the archive record in the data archive and a second plurality of attributes of the plurality of data record attributes, the second subset comprising selected attributes from the plurality of data record attributes, the selected attributes being those identified as necessary for access by users of the database;

adding the new archive index record to a dictionary-based archive index, the dictionary-based archive index comprising a plurality of archive index records, being stored separately from the database, and comprising a dictionary storing every term used in the plurality of index records;

deleting the data record from the database;

determining whether an attribute value of the plurality of attribute values is required for frequent user read access; and if the attribute value is not required for frequent user read access, deleting the attribute value from the dictionary-based archive index.

19. The method of claim 18, wherein the determining whether the attribute value of the plurality of attribute values is required for frequent user read access comprises analyzing data collected from queries run by users on the dictionary-based archive index to determine a frequency with which attributes of the plurality of attributes are accessed.

20. A method comprising:

identifying a data record to be archived, the data record comprising a plurality of data record attributes and originally residing in a database;

creating an archive record, the archive record comprising a first subset of the plurality of data record attributes, the first subset comprising at least some of the plurality of data record attributes;

storing the archive record in a data archive, the data archive being maintained separately from the database;

creating a new archive index record, the new archive index record comprising a reference to a location of the archive record in the data archive and a second plurality of attributes of the plurality of data record attributes, the second subset comprising selected attributes from the plurality of data record attributes, the selected attributes being those identified as necessary for access by users of the database;

adding the new archive index record to a dictionary-based archive index, the dictionary-based archive index comprising a plurality of archive index records, being stored separately from the database, and comprising a dictionary storing every term used in the plurality of index records;

deleting the data record from the database; and applying statistical techniques or artificial intelligence to determine which data record attributes are required for frequent user read access and should therefore remain in the database, and which data record attributes should be deleted because of lower user read access frequencies.

21. The computer program product of claim 8, wherein the adding of the new archive index record to the dictionary-based archive index further comprises:

identifying each term in the second subset of the plurality of attribute values; and adding each term to the dictionary if the term is not already in the dictionary, wherein at least one archive index record of the plurality of archive index records in the dictionary-based archive index comprises one term from a plurality of terms stored in the dictionary, references to locations of multiple archive records in the data archive that contain the one term, and information regarding locations of the one term within the referenced multiple archive records, and wherein the location information includes indications, for each one of the multiple of archive records referenced by the at least one archive index record, respective attributes of the one of the multiple archive records in which the one term is found.

22. A computer program product, encoded in an information carrier, operable to cause data processing apparatus to perform operations comprising:

identifying a data record to be archived, the data record comprising a plurality of data record attributes and originally residing in a database;

creating an archive record, the archive record comprising a first subset of the plurality of data record attributes, the first subset comprising at least some of the plurality of data record attributes;

storing the archive record in a data archive, the data archive being maintained separately from the database;

creating a new archive index record, the new archive index record comprising a reference to a location of the archive record in the data archive and a second plurality of attributes of the plurality of data record attributes, the second subset comprising selected attributes from the plurality of data record attributes, the selected attributes being those identified as necessary for access by users of the database;

adding the new archive index record to a dictionary-based archive index, the dictionary-based archive index comprising a plurality of archive index records, being stored separately from the database, and comprising a dictionary storing every term used in the plurality of index records;

deleting the data record from the database; and applying statistical techniques or artificial intelligence to determine which data record attributes are required for frequent user read access and should therefore remain in the database, and which data record attributes should be deleted because of lower user read access frequencies.

* * * * *